United States Patent [19]

Kurihara et al.

[11] Patent Number: 4,898,764
[45] Date of Patent: Feb. 6, 1990

[54] MOLDING OF FOAM RESIN HAVING A HOLLOW MEMBER

[75] Inventors: Junichi Kurihara; Masanori Hara, both of Wako, Japan

[73] Assignee: Honda Giken Kogyo Kabushiki Kaisha, Tokyo, Japan

[21] Appl. No.: 378,675

[22] Filed: Jul. 11, 1989

[30] Foreign Application Priority Data

Jul. 12, 1988 [JP] Japan .............................. 63-91483[U]

[51] Int. Cl.⁴ ................................................ B32B 3/26
[52] U.S. Cl. ...................................... 428/188; 428/31; 428/159; 428/160; 428/316.6; 428/319.7
[58] Field of Search ................. 428/31, 122, 159, 160, 428/188, 304.4, 316.6, 319.1, 319.7

[56] References Cited

U.S. PATENT DOCUMENTS

| | | | |
|---|---|---|---|
| 4,341,831 | 7/1982 | Kleiss | 428/319.1 |
| 4,663,210 | 5/1987 | Schreiber et al. | 428/319.1 |
| 4,786,540 | 11/1988 | Bruhnke et al. | 428/316.6 |

*Primary Examiner*—William J. Van Balen
*Attorney, Agent, or Firm*—Armstrong, Nikaido, Marmelstein, Kubovcik & Murray

[57] ABSTRACT

A molding of foam resin such as an instrument panel of a motor vehicle which carries an air duct or similar hollow member therewith. The molding has a substrate composed of a plurality of resin layers at least one of which is made of foam resin. Flanges extend outward from the hollow member and are buried in the foam resin layer of the substrate to securely mount the hollow member on the substrate.

6 Claims, 3 Drawing Sheets

MOLDING OF FOAM RESIN HAVING A HOLLOW MEMBER

BACKGROUND OF THE INVENTION

The present invention relates to an instrument panel of a motor vehicle or similar molding of foam resin having a layer of foam resin and, more particularly, to a molding of foam resin which carries an air duct or similar hollow member integrally therewith.

In general, an instrument panel of a motor vehicle has a laminate structure which is made up of a substrate, a covering, and a padding layer intervening between the substrate and the covering and made of foam polyurethane or similar foam resin. While the substrate has traditionally been implemented by hard resin such as ABS resin, a current trend in the art is toward a substrate which is also made of foam resin for the ease of fabrication. In this kind of instrument panel, the substrate and padding layer are formed together as a single molding of foam resin.

A hollow member such as an air duct which forms a part of an air conditioning conduitwork has to be mounted on an instrument panel and has to be surely fixed in place thereon. With an instrument panel having a substrate made of foam resin as stated above, it is extremely difficult to securely mount an air duct or similar part on the outer periphery of the panel. It has been customary, therefore, to bury such a part in the foam resin layer.

FIG. 3 indicates a prior art configuration of a molding of foam resin in which a hollow member is buried, together with a procedure for fabricating the molding. As shown, the molding is composed of a covering 1, a substrate 2 made of foam resin and provided on the back of the covering 1, and a hollow member 3 fully embedded in the substrate or foam resin layer 2. To fabricate this kind of molding, the covering 1 is laid on the working surface of a lower mold 4, then the hollow member 3 is placed on the upper surface of the covering 1 with the intermediary of a suitable support member 5, and then an upper mold 6 is closed. Subsequently, an undiluted solution of foam resin is introduced in the space defined between the covering 1 and the upper mold 6 and is caused to foam and solidify. The hollow member 3 is surely fixed in place in the molding because it is fully embedded in the foam resin layer 2 and because it is bonded to the foam resin layer 2 by the foam resin which contacts the surfaces of the part 3 before solidification. Since the molding is fabricated with the hollow member 3 being buried therein, an extra step of mounting the part 3 after the fabrication is not necessary.

However, a problem with the molding of the type shown in FIG. 3 is that the foaming pressure of the foam resin directly acts on the hollow member 3 during the course of formation of the foam resin layer 2, tending to deform the hollow member 3 such as an air duct. The deformation of the hollow member 3 due to the foaming pressure may be eliminated by filling the member 3 with air, water or similar fluid, then molding the foam resin layer 2, and then discharging the fluid from the part 3. This, however, cannot be practiced unless the fluid is introduced in and then discharged from the hollow member 3 by extra steps, resulting in an increase in the number of fabricating steps.

SUMMARY OF THE INVENTION

It is therefore an object of the present invention to provide a molding of foam resin to which a hollow member can be securely mounted during the formation of a foam resin layer without being deformed by the foaming pressure of foam resin.

A molding of foam resin of the present invention comprises a substrate constituted by a plurality of resin layers at least one of which is formed of foam resin, and a hollow member having outwardly extending flanges. The flanges of the hollow member are buried in the layer of foam resin.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
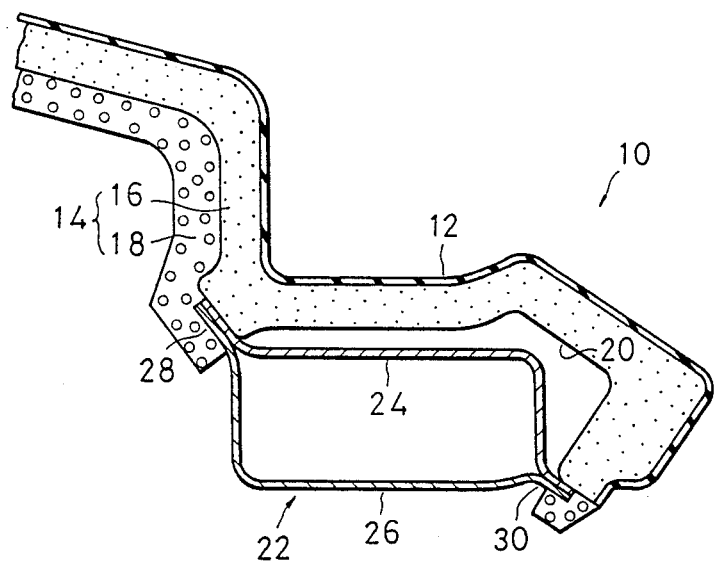
FIG. 1 is a fragmentary cross-section of an instrument panel which is representative of a molding of foam resin embodying the present invention.
Figure 3:
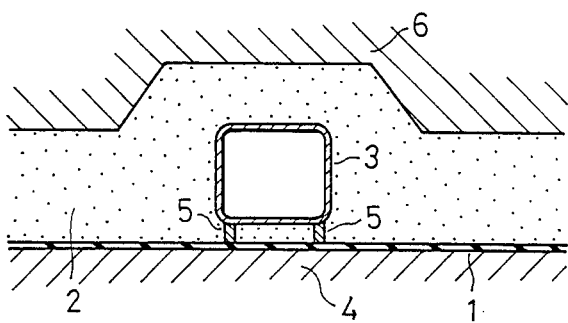
FIG. 3 is a section representative of a prior art method of fabricating a molding of foam resin in which a hollow member is buried.

Referring to FIG. 1 of the drawings, an instrument panel 10 representative of a preferred embodiment of the present invention is shown. As shown, the panel 10 has a covering 12 made of soft resin, and a substrate 14 provided on the back of the covering 12 and formed of foam polyurethane or similar foam resin. The soft resin implementing the covering 12 is prepared by adding polyvinyl chloride to ABS resin. The substrate 14 is composed of a primary foam resin layer 16 bonded to the back of the covering 12, and a secondary foam resin layer 18 bonded to the primary layer 16 except for a part thereof. In the instrument panel 10, therefore, the substrate 14 is implemented as a molding of foam resin only. The primary foam resin layer 16 has a substantially uniform thickness.

The primary foam resin layer 16 is provided with a recess 20 in a part thereof where the secondary foam resin layer 18 is absent. A hollow member in the form of an air duct 22 is disposed in the recess 20. The duct 22 is constituted by a pair of shaped sheet members 24 and 26 which are elongate in a direction perpendicular to the sheet surface of FIG. 1. Opposite side edges of the sheet members 24 and 26 are put together and bonded to form a substantially rectangular cross-section. The sheet members 24 and 26 are configured such that the bonded portions thereof are positioned at a pair of diagonally opposite corners of the rectangular major portion. The bonded portions, therefore, constitute a pair of flanges 28 and 30 extending outward from the rectangular major portion. The flanges 28 and 30 are held between the primary and secondary foam resin layers 16 and 18, whereby the duct 22 is fixed to the substrate 14. In this configuration, the instrument panel 10 carries the duct 22 integrally therewith.

Figure 2A:
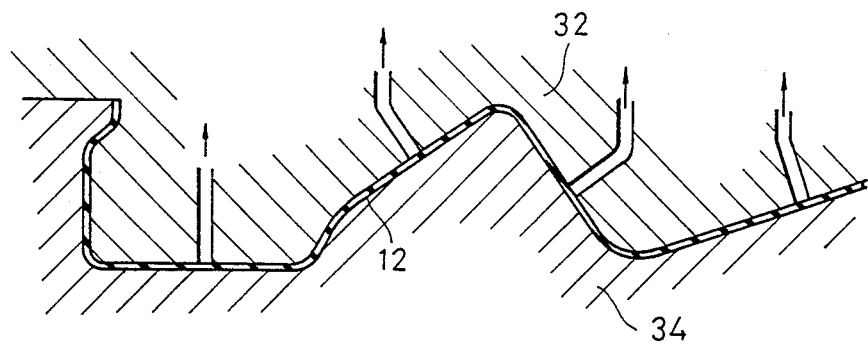
FIGS. 2A and 2D are sections demonstrating a sequence of steps for fabricating the instrument panel shown in FIG. 1.
Figure 2B:
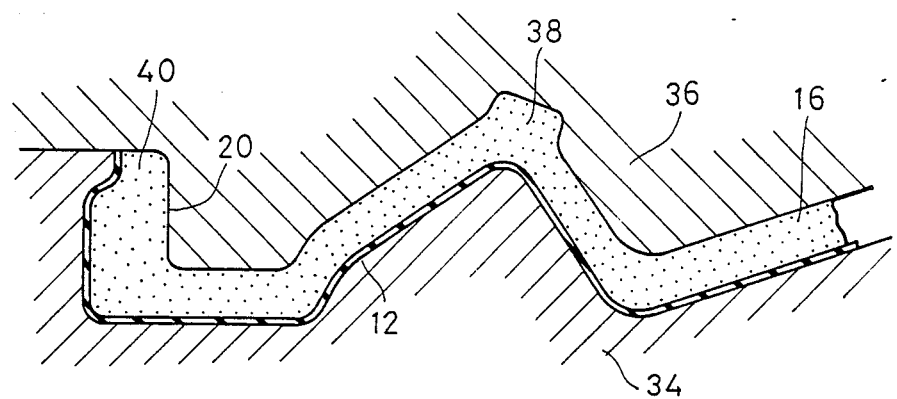

The instrument panel 10 with the duct 22 is fabricated as follows. As shown in FIG. 2A, the covering 12 is molded by using one or both of an upper mold 32 and a lower mold 34 and by sucking the covering 12 by vacuum. When the upper mold 32 is used, it is removed from the covering 12 after the step shown in FIG. 2A. Then, as shown in FIG. 2B, an exclusive upper mold 36 for molding the primary foam resin layer 16 is set above and at a predetermined distance from the covering 12 and then lowered toward the lower mold 34. In this condition, an undiluted solution of foam resin is injected into the space between the covering 12 and the exclusive mold 36. As the solution is caused to foam and solidify, it forms the primary foam resin layer 16 on the back of the covering 12. In this instance, the upper mold 36 provides the primary foam resin layer 16 with a pair of support portions 38 and 40 for supporting the flanges 28 and 30 of the duct 22, and the recess 20 intervening between the support portions 38 and 40.

Figure 2C:
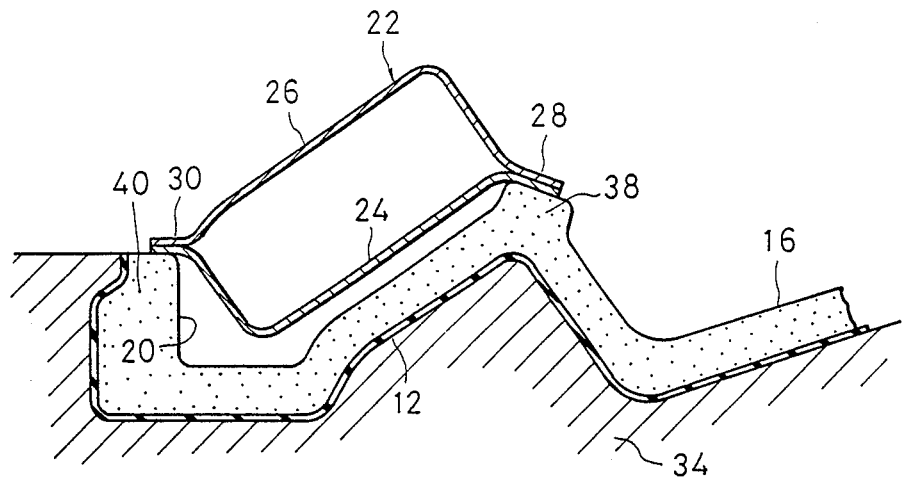

After the exclusive upper mold 36 has been removed, the duct assembly 22 is placed in the recess 20 with its flanges 28 and 30 being respectively positioned on the support potions 38 and 40 of the primary foam resin layer 16, as shown in FIG. 2C. More specifically, the support portions 38 and 40 are configured in association with the flanges 28 and 30 of the duct 22. When the duct 22 is supported by the support portions 38 and 40 as mentioned, a gap is defined between the duct 22 and the bottom of the recess 20.

Figure 2D:
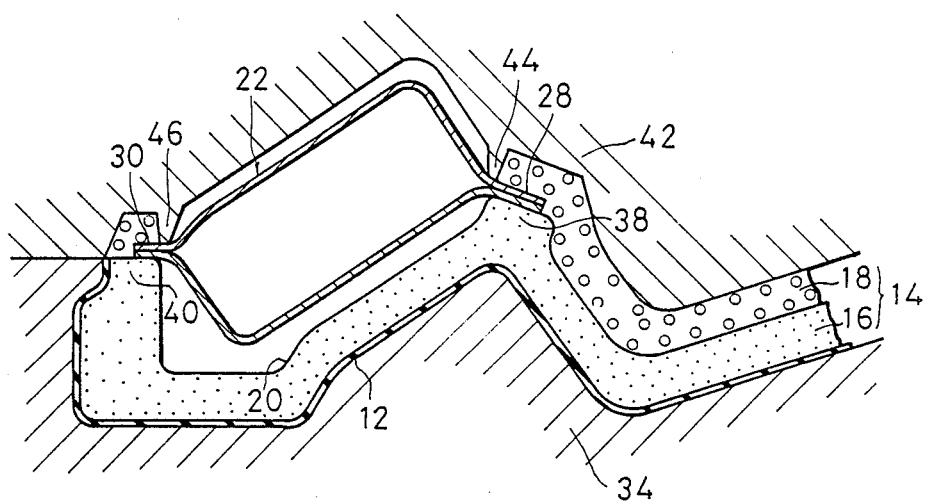

Thereafter, as shown in FIG. 2D, an exclusive upper mold 42 for forming the secondary foam resin layer 18 is so positioned as to form a predetermined space between itself and the primary foam resin layer 16. The mold 42 has a pair of projections 44 and 46. The flanges 28 and 30 of the duct 22 are held by the projections 44 and 46 and the support portions 38 and 40 of the primary foam resin layer 16. Then, an undiluted solution of foam resin is injected into the space between the primary foam resin layer 16 and the upper mold 42. The solution foams and solidifies to form the secondary foam resin layer 18. At this instant, the projections 44 and 46 of the mold 42 prevent the foam resin from entering the space defined between the projections 44 and 46, upper mold 42, and duct 22. Further, since the support portions 38 and 40 of the primary foam resin layer 16 and the flanges 28 and 30 of the duct 22 remain in intimate contact with each other, the foam resin is inhibited from entering the space between the duct 22 and the primary foam resin layer 16. Thereafter, the upper mold 42 and lower mold 34 are removed to produce the instrument panel 10 having the duct 22, as shown in FIG. 1.

In the instrument panel 10 fabricated by the above procedure, only the pair of flanges 28 and 30 of the duct 22 are buried in the interface between the primary and secondary foam resin layers 16 and 18. Therefore, the foaming pressure being developed during the formation of the secondary foam resin layer 18 acts on the flanges 28 and 30 only and does not act on the hollow major part of the duct 22. This prevents the duct 22 from being deformed by the foaming pressure and thereby allows a designed amount of air to flow through the duct 22 for the air conditioning purpose.

The resin forming the secondary foam resin layer 18 on the primary foam resin layer 16 soaks into the surface of the primary layer 16, insuring firm bond of the primary and secondary layers 16 and 18. The flanges 28 and 30 of the duct 22 are buried in between the primary and secondary layers 16 and 18. This, coupled with the fact that the resin forming the secondary layer 18 adheres the flanges 28 and 30 to the layers 16 and 18, firmly connects the duct 22 to the substrate 14 while the substrate 14 is produced.

The substrate 14 is composed of the primary and secondary foam resin layers 16 and 18, and the primary layer 16 is formed on the back of the covering 12 first. Hence, the primary layer 16 and the covering 12 are surely connected together. The primary layer 16 is provided with a substantially uniform thickness to eliminate the deformation of the covering 12 while the resin forming the layer 16 solidifies. Even though the thickness of the secondary layer 18 may noticeably differ from one portion to another, the primary layer 16 prevents the layer 18 from being deformed due to the difference in contraction which occurs during the solidification. Hence, the instrument panel 10 having an irregular thickness distribution can be fabricated with accuracy.

Since the primary layer 16 is formed on the covering 12 beforehand, it is possible to form the support portions 38 and 40 integrally therewith for supporting the flanges 28 and 30 of the duct 22. This eliminates the need for extra members for supporting the duct 22. The position for burying the duct 22 is readily adjustable by selecting, for example, the height of the support portions 38 and 40 of the primary layer 16 adequately.

In the illustrative embodiment, a gap is defined between the lower end of the duct 22 and the bottom of the recess 20 of the primary foam resin layer 16. Alternatively, an arrangement may be made such that the bottom of the recess 20 makes contact with the lower end of the duct 22. This alternative configuration will cause the primary layer 16 to support the duct 22 over the entire lower end of the latter, thereby preventing the duct 22 from being dislocated during the formation of the secondary layer 18 more positively.

The illustrative embodiment has been shown and described by taking as an example the instrument panel 10 having two foam resin layers 16 and 18 and to which the air duct 22 of an air conditioning conduitwork is fitted. It is to be noted that the present invention is applicable to any other kind of molding of foam resin in which a hollow member is fitted on a laminate resin substrate at least one layer of which is made of foam resin, even if the other laminate layer is made of hard resin or similar material. This can be implemented simply by burying the flanges of the hollow member in the foam resin layer.

In summary, in accordance with the present invention, a hollow member has flanges which are buried in a foam resin layer. Hence, when the foam resin layer is foamed, its foaming pressure is prevented from acting on the other or major part of the hollow member. This allows the hollow member to be fixed in place on a molding during the formation of the molding while freeing the hollow member from deformation, thereby realizing an inexpensive molding of foam resin having a hollow member of desired configuration therewith.

Various modifications will become possible for those skilled in the art after receiving the teachings of the present disclosure without departing from the scope thereof.

What is claimed is:
1. A molding of foam resin, comprising;
   a substrate constituted by a plurality of resin layers at least one of which is formed of foam resin; and
   a hollow member having outwardly extending flanges;

said flanges of said hollow member being buried in said layer of foam resin.

2. A molding as claimed in claim 1, wherein said substrate comprises two layers of foam resin which are bonded to each other, said flanges of said hollow member being buried in an interface between said two layers.

3. A molding as claimed in claim 2, further comprising a covering, said substrate comprising a primary foam resin layer formed integrally with said covering and a secondary foam resin layer formed on said primary foam resin layer.

4. A molding as claimed in claim 3, wherein said primary foam resin layer has a substantially uniform thickness.

5. A molding as claimed in claim 3, wherein said primary foam resin layer comprises support portions for supporting and positioning said flanges of said hollow member.

6. A molding as claimed in claim 1, wherein said hollow member comprises two shaped sheet members having portions which are joined to each other, said portions forming said flanges.

* * * * *